July 9, 1957
W. S. ARLEQUE
2,798,695
OIL COOLING DEVICE FOR AUTOMOBILE AND OTHER
INTERNAL COMBUSTION ENGINES
Filed Nov. 2, 1954
2 Sheets-Sheet 2
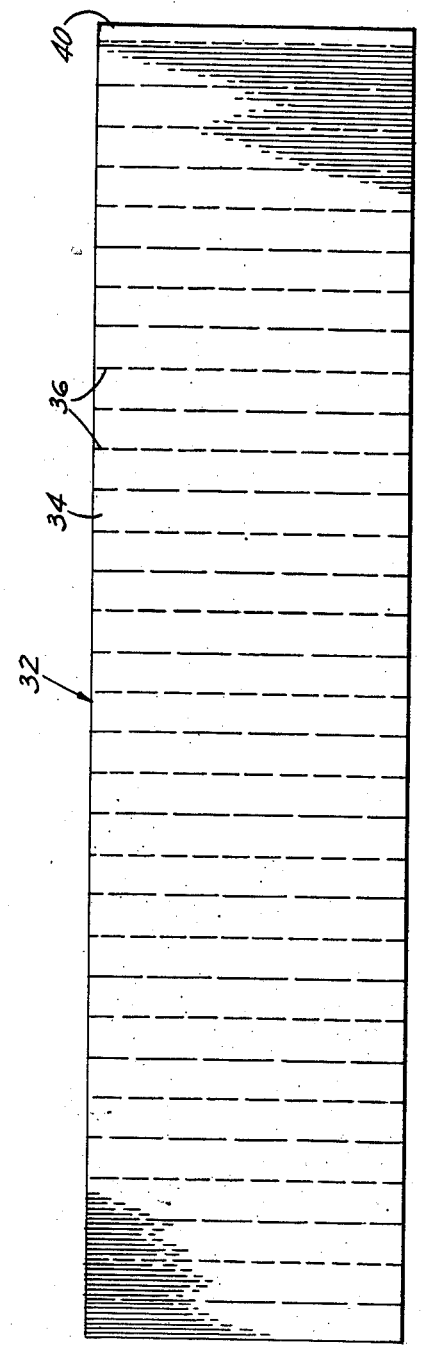
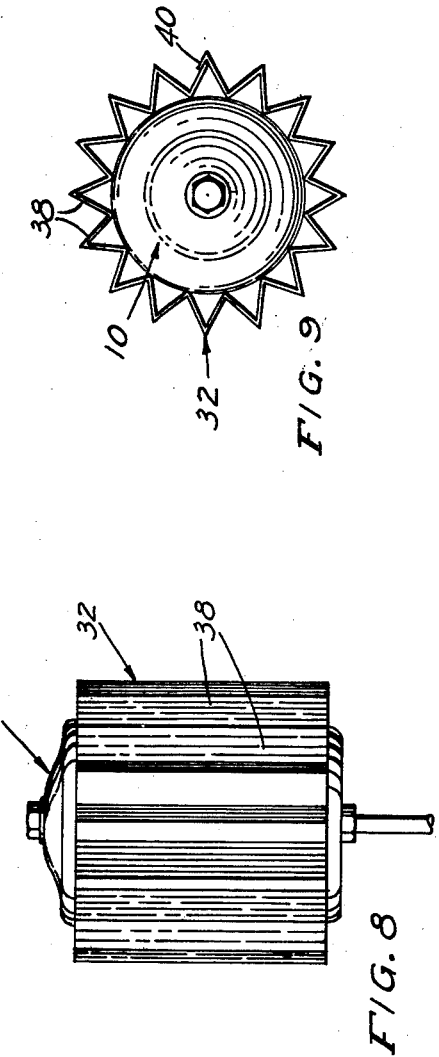
WARREN S. ARLEQUE
INVENTOR.
BY
McMorrow, Berman + Davidson
ATTORNEYS United States Patent Office 2,798,695
Patented July 9, 1957

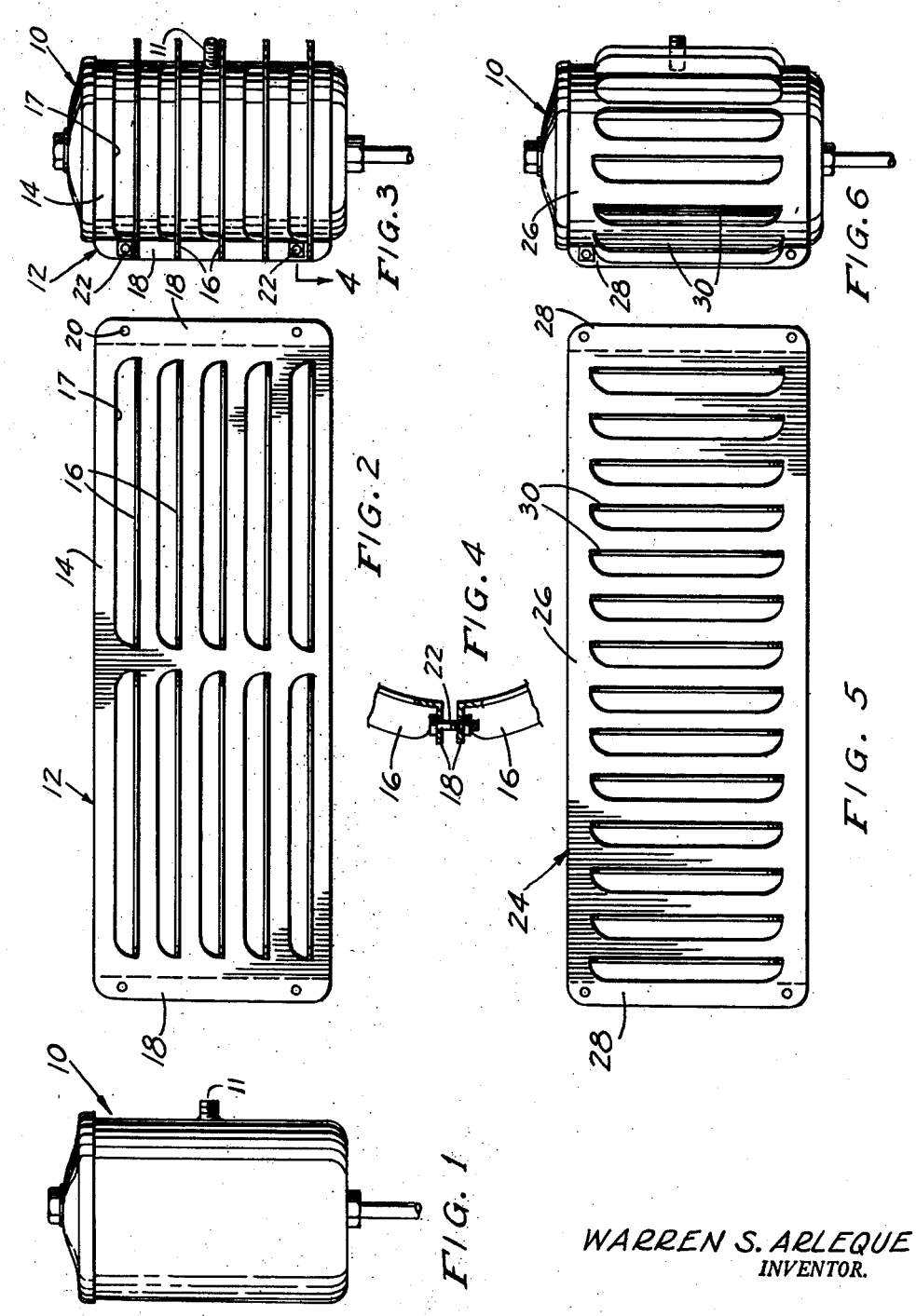

2,798,695

OIL COOLING DEVICE FOR AUTOMOBILE AND OTHER INTERNAL COMBUSTION ENGINES

Warren S. Arleque, Methuen, Mass.

Application November 2, 1954, Serial No. 466,264

1 Claim. (Cl. 257—263)

This invention relates to lubricant cooling devices. More particularly, the invention has reference to a device adapted to be formed either as an attachment to or as a permanent part of an oil filter or strainer used on internal combustion engines, particularly automobile engines.

The oil filters of automobile and other internal combustion engines are mounted in exposed positions in most instances, this being particularly true of the later model automobiles. During operation of the vehicle, oil flows through the filter continuously, and in view of the exposed positions of the filter and the desirability for providing a means adapted to affect a positive cooling action as regards the flowing lubricant, it is proposed, in carrying out the present invention, to provide means particularly adapted to dissipate a substantial amount of the heat of the oil through the wall of the filter casing.

To this end, the present invention, while being adapted for manufacture in various forms, is in every instance disposed as a covering extending about the wall of the filter casing, which covering is so shaped as to extract or dissipate a substantial amount of the heat of the oil flowing through the filter, through the casing wall. The temperature of the oil is thus positively lowered, during the operation of the vehicle.

The invention in some forms includes a finned cover element or sleeve for the filter casing which, due to the increased area exposed to impingement by surrounding air, serves effectively to dissipate heat through the wall of the casing at a far greater rate than would be true were the finned structure not employed. In other forms of the invention, the fins may be used in combination with air scoops and may in fact be formed as scoop-like devices adapted to trap air moving past the engine during the operation of the vehicle by reason of operation of the cooling fan. Said air, thus directed against the casing wall, further serves to cool said wall and dissipate the heat of the oil. In still other forms, the fins may be omitted entirely and the device may be composed entirely of air scoop means that is especially adapted to direct air into impinging relation to the casing of the filter.

The invention is particularly capable of being used to advantage in extremely hot climates, as well as in extremely cold climates where an oil of low viscosity (sometimes thinned with kerosene) is used. Oil of this type reduces greatly the engine protection, lubricationwise, due to the creation of excess friction in the engine parts when the engine is warmed up to normal operating temperatures. In all climates, however, the device can be used to advantage, and substantially reduces engine friction by maintenance of a more constant oil temperature and viscosity than is true when the device is not used.

Other objects will appear from the following description, the claim appended thereto, and from the annexed drawing, in which like reference characters designate like parts throughout the several views, and wherein:

Figure 1 is a side elevational view of one type of oil filter of conventional design to which the invention may be applied;

Figure 2 is a plan view of the cooling device, prior to its being bent into a shape in which it extends about the filter;

Figure 3 is a side elevational view of the completed device assembled with the filter of Figure 1;

Figure 4 is an enlarged, detail sectional view on line 4—4 of Figure 3;

Figure 5 is a view similar to Figure 2 showing a modified form;

Figure 6 is a view similar to Figure 3 showing the modified device mounted upon the filter of Figure 1;

Figure 7 is a view similar to Figure 2 showing a second modification;

Figure 8 is a view similar to Figure 3 showing the form of Figure 7 in its completed state, mounted upon the filter of Figure 1; and Figure 9 is a top plan view of the filter and the cooling device shown in Figures 7 and 8.

In the several figures of the drawings, the invention has been shown as an attachment separably connectable to a conventional oil filter 10 having a laterally projecting nipple 11 for connection of an oil line, not shown. However, from the description which will be provided, it will be apparent that the device can be attached permanently to the casing and the oil filter, instead of being merely a detachable unit.

In Figure 1 there is shown a strainer or oil filter of a well known type. In this connection, while the invention is well adapted for mounting on the illustrated filter, it is intended particularly for association with flange-mounted filters or strainers. Strainers or filters of this type are found on later model vehicles particularly. Such a filter or strainer is provided with a cylindrical casing having an outwardly directed flange at one end connectable directly to a pad on the vehicle engine, with the oil inlet and outlet being formed in the base, instead of being provided by pipe lines such as those shown in the filter of Figure 1.

The invention, however, can be used on either type of filter, as will become apparent from the description to be provided hereinafter.

In any event, referring to Figure 2 the device is illustrated as being formed from a rectangular, relatively elongated length of any suitable sheet metal material having a high rate of thermal conductivity. The cooling device 12 thus comprises a cylindrical sleeve element 14 shown in developed form in Figure 2. As shown in Figure 2, the sleeve element has struck from the material thereof a plurality of fins 16. The fins 16 are elongated, each fin extending substantially half the length of the rectangular piece of material from which the sleeve element is formed. Each fin, thus, may be appropriately considered as extending through slightly less than half the circumference of the sleeve.

The fins 16 each lie in a plane normal to the axis of the sleeve element. Further, the fins, being struck out of the material of the sleeve element, define immediately thereabove slots 17 coextensive in length with the respective fins and providing cooling slots through which air may impinge directly against the wall of the casing of the filter 10. When the device is attached, the nipple 11 extends through an opening 17 to insure against downward slippage of the cooling device off the filter casing even if the connecting bolts, which will be described hereinafter, tend to become loose due to vibration of the vehicle engine.

The fins are arranged in two diametrically opposed banks, each bank of fins comprising a series of parallel fins coterminous with one another and spaced apart axially of the sleeve.

In use of the form of the invention shown in Figures 1–4, the sleeve element is provided with radially, outwardly extending, closely spaced ears 18 having openings 20 receiving connecting bolts 22, whereby the sleeve element may be drawn tightly about the casing 10. The device is now ready for use, and when oil flows through the filter and as usual, is heated to an undesirably high temperature by operation of the engine, said heat will be dissipated through the wall of the filter casing, by heat transfer through said wall, to the casing contacting surface of the sleeve 14, and through the fins 16. A substantially greater area of the filter is in contact with the surrounding air, through the medium of the sleeve having the several fins, than is true of a conventional filter casing such as that shown in Figure 1.

In Figures 5 and 6 a modified form designated generally at 24 is shown, including an elongated, rectangular blank 26 of material shaped to provide a cylindrical sleeve having at closely spaced locations taken circumferentially thereof radially, outwardly directed flanges or ears 28, through which the connecting bolts 20 may be extended in the same manner as in the first form.

In this form of the invention, the fins 30, while being struck out of the material of the sleeve to leave slots extending adjacent thereto, are not extended circumferentially of the sleeve. Rather, each fin extends longitudinally of the sleeve in parallelism with its axis, the several fins being equidistantly spaced about the circumference of the sleeve as shown in Figure 6.

In both forms of the invention, the sleeve can be placed about the cylindrical casing with ease, and tightened thereagainst. Further, when a flange-mounted strainer is involved, the sleeve can be simply slipped over the outwardly projecting, unflanged end of said strainer and then tightened in place thereabout.

In Figures 7–9 another modified form designated generally at 32 is shown. This includes an elongated, rectangular blank of sheet metal material which, as in the other forms, has a high rate of thermal conductivity. The blank in this instance is substantially longer than those used in the first forms of the invention, and is folded along equidistantly spaced, transversely extending lines 36, said lines occurring over the full length of the blank. The strainer sleeve 34 is folded first in one direction and then in an opposite direction, in an alternating arrangement so as to produce a plurality of flutes or corrugations 38 of V-shaped or triangular cross section. Said flutes, in the final form of the device, extend radially, outwardly from the filter casing, the sleeve being shaped into a cylindrical form so as to dispose the bases of the flutes in contact with the wall of the filter casing. At their opposite ends, the flutes are open, so as to permit air to pass therethrough and impinge upon the wall of the casing.

At one end, the blank of material has a narrow flange 40 which is spot welded to the opposite end of the blank when the sleeve is in its final shape as shown in Figure 9.

If desired, a hood shaped as a sphere could be attached to the form of the invention shown in Figures 7–9, so as to serve as an air scoop which will trap air and deflect the same through the spaces defined by the flutes or corrugations 38.

The inside diameter of the form of Figures 7–9 is such as to permit the device to be pressed over the oil filter casing, while being in firm engagement therewith at the bases of the corrugations. The device is thus held frictionally in contact with the filter casing.

An air scoop of the type referred to above would be formed as a one-fourth segment of a hollow sphere, faced toward the front of the vehicle and having a bottom edge seated upon the apices of the flutes or corrugations.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

The combination, with the casing of an oil filter of an internal combustion engine, and with a nipple extending laterally from the casing for connecting an oil line thereto, of a cooling device comprising: a cylindrical sleeve element for receiving said casing and formed of a single piece of sheet material having a high thermal conductivity rating, said sleeve element including two, like series of elongated, narrow fins, the fins of each series extending in parallel relation and being uniformly spaced in a direction axially of the sleeve element with each fin extending circumferentially of the element an angular distance slightly less than 180° of said circumference, each fin of a series lying in a plane normal to the axis of the sleeve element and common to that of the corresponding fin of the other series, the fins being struck out of the material of the sleeve element leaving cooling slots coextensive in length with the respective fins through which slots air may impinge directly against the casing, said nipple projecting through one of the slots to substantially limit the sleeve element against slippage on the casing in an axial direction, the piece of material of which the sleeve element is formed including at its ends ears angularly spaced about the sleeve element and extending parallel to the axis of the sleeve element, said ears projecting radially outwardly from the element and having aligned openings; and connecting means extending through the openings for drawing the ears toward each other to thereby clampably engage the sleeve element about the casing.

References Cited in the file of this patent

UNITED STATES PATENTS

| 653,120 | Reid | July 3, 1900 |
| 1,929,540 | Trane | Oct. 10, 1933 |
| 1,992,646 | Young | Feb. 26, 1935 |
| 2,463,800 | Pate | Mar. 8, 1949 |
| 2,468,866 | Collier | May 3, 1949 |
| 2,680,009 | Nekut | June 1, 1954 |
| 2,699,323 | Bergstom | Jan. 11, 1955 |

FOREIGN PATENTS

| 1,021,553 | France | Dec. 3, 1952 |